Sept. 13, 1955

W. G. ARCHER
ROLLERS 2,717,814

Filed Jan. 10, 1951

Inventor
William Grant Archer
By J P Moran
Attorney

Sept. 13, 1955     W. G. ARCHER     2,717,814
ROLLERS

Filed Jan. 10, 1951     3 Sheets-Sheet 2

Inventor
William Grant Archer
By *J. P. Moran*
Attorney

Sept. 13, 1955 W. G. ARCHER 2,717,814
ROLLERS
Filed Jan. 10, 1951 3 Sheets-Sheet 3
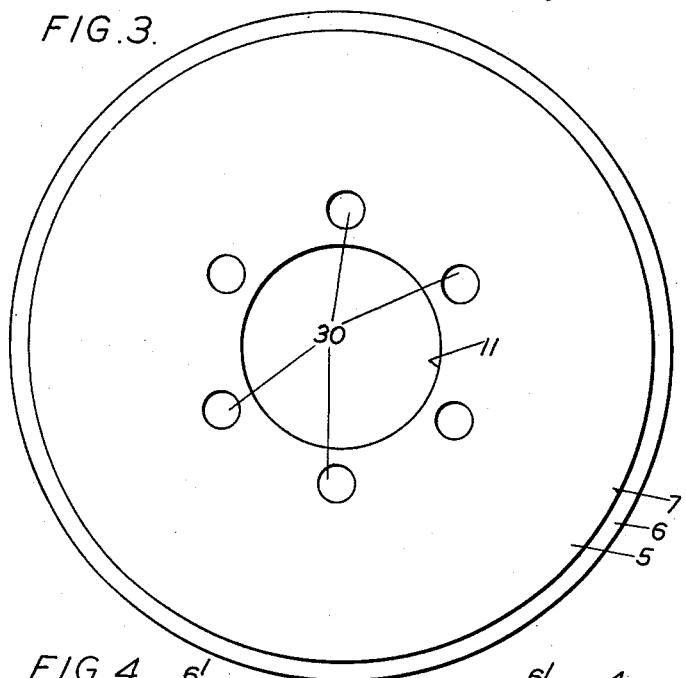
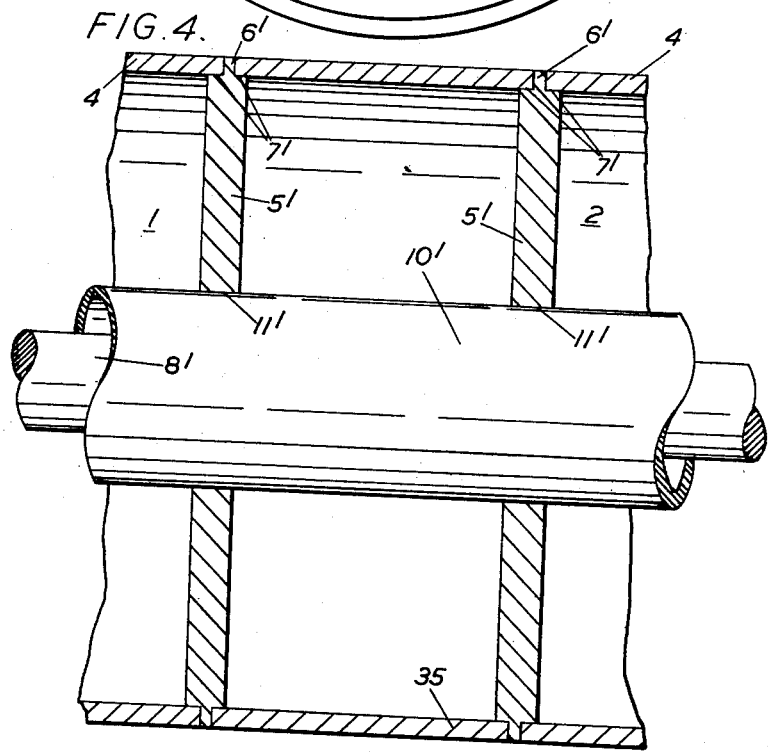
Inventor
William Grant Archer
By J. P. Moran
Attorney

United States Patent Office 2,717,814
Patented Sept. 13, 1955

2,717,814
ROLLERS

William Grant Archer, London, England, assignor to Babcock & Wilcox Limited, London, England, a British company Application January 10, 1951, Serial No. 205,257

1 Claim. (Cl. 308—20)

This invention relates to rollers and more particularly to rollers suitable for use, for example, in belt conveyors. The belt of a belt conveyor is supported by groups of troughing or flat idler rollers and groups of return idler rollers. Guide idler rollers may also be provided for acting on the edges of the belt. In a belt conveyor of appreciable length a considerable number of groups of troughing or flat idler rollers and return idler rollers must be used and as each group comprises several rollers, a large number of rollers is involved. The provision of rollers which may be economically manufactured, is, therefore, of prime importance as also is economy in maintenance. Ease in replacement of rollers is also a desideratum. Bearings adapted to give low frictional losses as well as reliable service for long periods of time under conditions of dust, grits, liquid or other deleterious matter are highly desirable. Moreover, the use of rollers having relatively low moments of inertia facilitates starting of a belt conveyor. The invention is directed to the provision of improved rollers.

It is an object of the invention to provide a roller which is readily and easily maintained. A further object of the invention is to provide a roller having a bearing unit which can readily be separated from the shell of the roller. A still further object is to provide a bearing unit charged with lubricant in a manner such that the need for periodic lubrication is obviated. Yet another object of the invention is to provide a roller of simple design which is easy to manufacture.

The invention will now be described, by way of example, with reference to the accompanying drawings, in which:

Figure 3 is a fragmentary side view of the spacer of Figure 2; and

Figure 4 is a fragmentary side elevation, mainly in section, illustrating a modification of Figure 1.

Figure 1:
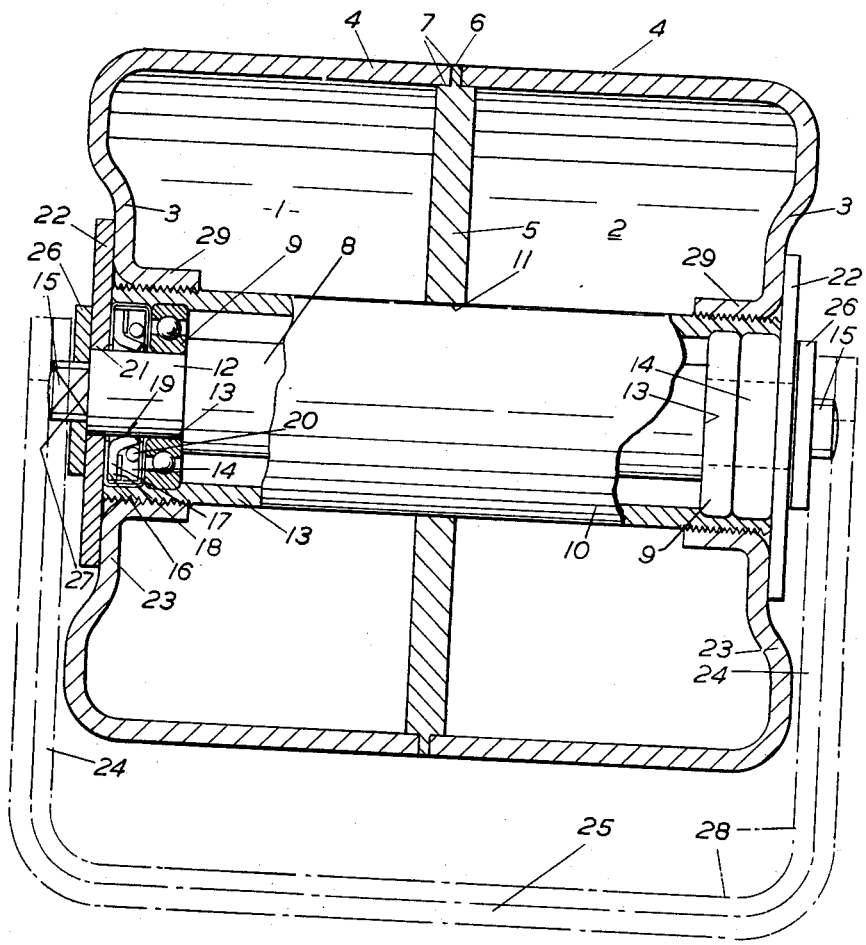
Figures 1 and 2 are side elevations, mainly in section, of different embodiments of the invention, supporting brackets being shown in dotted lines.
Figure 2:
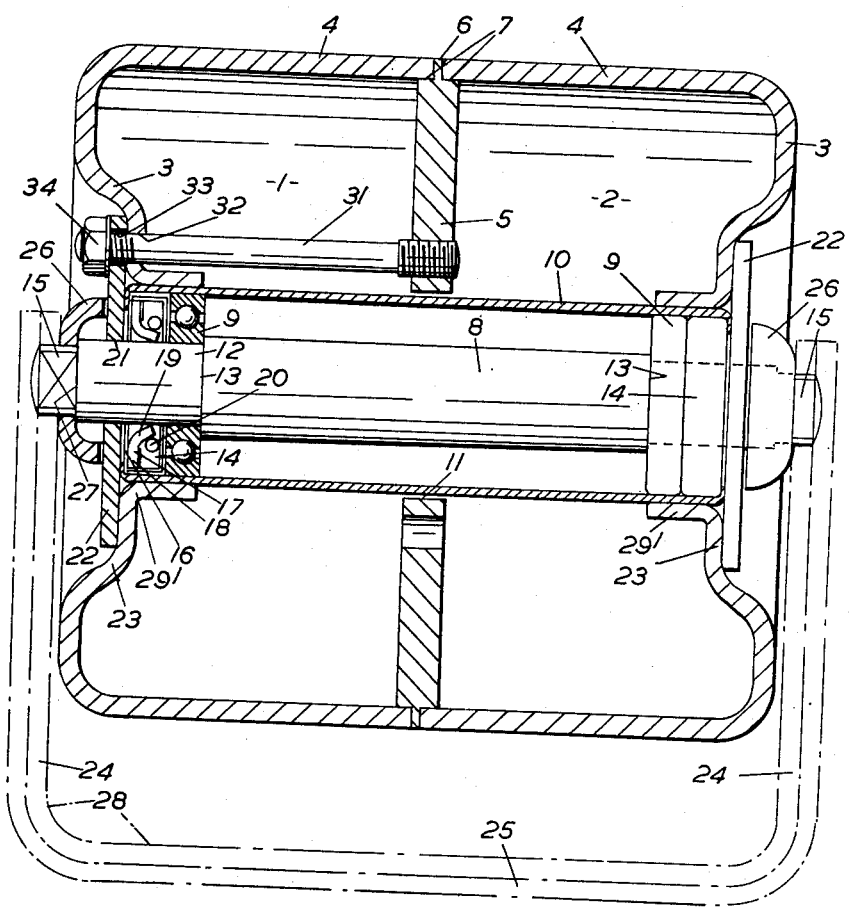

In Figures 1 and 2 the roller includes two similar pressed or entered metal portions 1 and 2, each having an apertured supporting hub part 3 and a second part 4 of cylindrical shape extending towards the centre of the roller, where locating means are provided for holding the parts 4 in alignment.

The locating means are formed by an annulus 5 of plate metal having a thin, central, annular flange 6 extending radially outwards to the outer surfaces of the parts 4. The shoulders 7 at opposite sides of the flange 6 respectively fit within the inner extremities of the parts 4 of the portions 1 and 2, the ends of the said parts abutting against opposite sides of the flange.

Advantageously, the shoulders 7 are slightly sloped to give a larger diameter at their inner edges than at their outer edges, so that good contact is obtained between the shoulders and the inner surfaces of the parts 4, even if the inner diameters of the latter are slightly oversize, whilst if they are slightly undersize difficulty in assembling the parts is avoided.

Generally the portions 1 and 2 and the annulus 5 will be of steel, but other suitable material such as aluminium may be used.

The roller is mounted on a supporting spindle 8 by suitable bearing 9, shown as ball bearings, provided within a tube 10, which extends between the apertured supporting hub parts 3 and through the central aperture 11 of the annulus 5 and through which the spindle passes. The spindle is formed with end parts 12 of reduced diameter on which are fitted against the shoulders 13 the inner races of the ball bearings 9 and, outwardly of the bearings, suitable of glands 14 for sealing the ends of the tube. Each extremity of the spindle is formed with diametrically opposite flats 15.

In the form illustrated, the gland includes a ring 16 of channel-shaped cross-section with an open inner side, a flexible packing ring having a radially extending outer part 17 held against the outer side wall of the ring 16 by an internal annular flange 18 on the ring and an inner part 19 extending axially inwards and urged towards the spindle 8 by an elastic ring 20, suitably in the form of an endless helical spring. Suitable means are provided for inhibiting rotation of the ring within the end of the tube 10. For example the ring may be spot welded to the tube.

The spindle 8 fits through the central apertures 21 in end closure plates 22, which engage the outer faces of the central inwardly dished portions 23 of the hub parts 3 and the ends of the spindle are adapted to be frictionally held between the spring arms 24 of a bracket 25, the inward pressure of the spring arms being transmitted through washers 26 to the shoulders 27 at the inner ends of extremities of the spindle of reduced diameter. It will be seen that the portions 23 of the hub parts are set inwardly to a degree sufficient to accommodate the closure plates, and in Figure 2 the securing means therefor, and that the clearances between the peripheral portions of the hub parts and the bracket arms 24 are of limited but adequate width.

The bracket 25 illustrated is of the form more particularly described in the specification of co-pending patent application Serial No. 205,343 filed January 10, 1951, the bracket being in the form of a strip in which is pressed a wide longitudinally extending rib 28, the ends of the arms 24 being formed with slots into which fit the extremities of the spindle formed with the flats 15 and base of the bracket being formed with screw holes for securing the bracket to a base or transom.

In Figure 1 the tube 10 forms part of the holding means for preventing relative axial movement of the roller portions 1 and 2. As shown, the hub parts 3 are formed with internally threaded, inwardly projecting sleeves 29 screwed onto threaded end parts of the tube. The closure plates 22 which tend to prevent ingress of dust or other foreign matter to the glands 14 are held by screws (not shown) to the portions 23 of the hub parts 3.

The holding means for preventing relative axial movement of the roller portions may be of any suitable form and may include bolts or equivalent means acting between each hub part and suitable locating means. Thus in Figures 2 and 3 the annulus 5 is formed with six concentrically arranged, equidistantly spaced threaded holes 30 into which are screwed studs such as the stud 31, alternate studs extending in opposite directions. For the sake of simplicity only one stud is shown in Figure 2. Each stud passes through holes 32 and 33 in an apertured supporting hub part 3 and closure plate 22 respectively and a nut 34 screwed onto the end of the stud acts through a washer to clamp the closure plate against the hub and the associated part 4 against the annular flange 6.

The bearings 9 and glands 14 of Figure 2 are contained in a thin-walled tube 10 which fits within inwardly projecting sleeves 29' provided on the hub parts 3 and is clamped between the closure plates 22. The ends of the tube are turned inwardly around the outer edge of the gland ring 16 and advantageously the tube is filled with oil or grease. Upon removal of an end closure plate 22 the tube is accessible and may readily be withdrawn and replaced.

In the manufacture of the rollers illustrated, the portions 1 and 2 may be accurately and economically formed by pressing from sheet metal or by extrusion and tubing of standard size may be used for the tubes 10.

The inner ends of the cylindrical parts 21 are accurately positioned and the strength of the parts is reinforced by the annulus 5, so that a rigid roller is obtained with the portions 1 and 2 formed with walls of no great thickness. As a consequence the moment of inertia of the roller is low.

A roller may quickly be withdrawn from or inserted in position on a bracket, since the roller is frictionally held and there are no clamping nuts to manipulate. If any part of a roller becomes worn or damaged, it may readily be replaced. During operation, dirt is effectively excluded from the bearings and in this connection it may be noted that the central depressions on the outer sides of the hub parts are so slight that, when a roller is used in an inclined position as a troughing idler roller, liquid falling into the depression at the upper part of the roller rapidly drains therefrom.

In some instances separate locating means such as the annulus 5 at the inner ends of the two roller portions may be dispensed with, the locating means being formed integrally with the cylindrical parts of the roller. For example, one cylindrical roller part may be provided at its inner end with an inner step onto which the inner extremity of the other cylindrical roller part fits. In such case, the two portions of the roller may be held together by bolts or studs passing through holes in the hubs and the closure plates.

The modification illustrated in Figure 4 is useful when a relatively long roller is needed, the increased length being obtained by interposing between the portions 1 and 2 a spacer including an intermediate part of cylindrical or substantially cylindrical shape. As shown two annuli 5' similar to the annulus 5 of Figure 1 are used and the inner surfaces of the parts 4 engage the outer shoulders 7' of the respective annuli, the inner ends of the said parts engaging the outer faces of the annular flanges 6'. Between the annuli 5' is inserted a sleeve 35, the inner surface of which engages the inner shoulders 7' of the annuli and the ends of which engage the inner faces of the annular flanges 6'. The spindle 8' and tube 1' are of appropriately increased length.

It will be seen that the portions 1 and 2 and the annuli 5' may be standard parts utilised when a roller of normal length is required. Since the portions 1 and 2 are of limited length they may economically be pressed or extruded without difficulty.

I claim:

A roller comprising a shell including a part having a substantially circular cross section and provided with apertured supporting hub means; a bearing unit including a tube supported within the apertures of said hub means and extending axially through the shell, a spindle extending within, projecting from, and spaced from the tube, bearings supporting the spindle within the tube and respectively disposed wholly within end portions of the tube, and a gland within each end portion of the tube outwardly of the adjacent bearing and sealing the space between the tube and the spindle; said tube being movable axially through the apertures of the hub means; and releasable holding means securing the bearing unit against axial displacement relative to the shell to enable the bearing unit readily to be withdrawn axially from the shell.

References Cited in the file of this patent

UNITED STATES PATENTS

| | | |
|---|---|---|
| 1,345,848 | Hardy | July 6, 1920 |
| 1,503,920 | Schneebeli | Aug. 5, 1924 |
| 1,602,630 | White | Oct. 12, 1926 |
| 1,837,480 | Philips | Dec. 22, 1931 |
| 1,884,340 | Stegeman | Oct. 25, 1932 |
| 2,089,963 | Johnson | Aug. 17, 1937 |
| 2,312,610 | Weiss et al. | Mar. 2, 1943 |
| 2,353,510 | Searles et al. | July 11, 1944 |
| 2,557,418 | Duncan | June 19, 1951 |

FOREIGN PATENTS

| | | |
|---|---|---|
| 620,913 | Great Britain | Mar. 31, 1949 |